United States Patent [19]

Raynor

[11] Patent Number: 5,301,229
[45] Date of Patent: Apr. 5, 1994

[54] ADJUSTABLE HEIGHT PEDESTAL FOR PUBLIC AND COIN TELEPHONES

[75] Inventor: James E. Raynor, Woodstock, Ga.

[73] Assignee: Phillips & Brooks/Gladwin, Inc., Cumming, Ga.

[21] Appl. No.: 840,107

[22] Filed: Feb. 24, 1992

[51] Int. Cl.$^5$ .......................................... H04M 17/00
[52] U.S. Cl. .................................. 379/143; 379/428; 379/440; 379/155
[58] Field of Search ............... 379/143, 454, 453, 155, 379/419, 437, 428, 440, 451; 248/161, 188.5, 354.1; D14/146, 149, 150, 151

[56] References Cited

U.S. PATENT DOCUMENTS

| | | | |
|---|---|---|---|
| 3,033,509 | 5/1962 | Carlson | 248/359.1 X |
| 3,752,927 | 8/1973 | Bartley et al. | 379/454 |
| 4,246,451 | 1/1981 | Nix | 379/451 X |
| 4,396,176 | 8/1983 | Hannula | 379/453 X |

OTHER PUBLICATIONS

Nix & Miller, "Universal Adjustable Pedestal", 1990.

Primary Examiner—Stephen Chin
Assistant Examiner—Paul Loomis
Attorney, Agent, or Firm—Deveau, Colton & Marquis

[57] ABSTRACT

An adjustable height mounting pedestal (10) for public or coin telephones (18) comprises a tubular upright post (12) having a plurality of arrangements of mounting holes (80) corresponding to varying telephone mounting heights ranging from a drive-up curb side height to a standard handicap access height. A backboard mounting enclosure (16) is longitudinally aligned with and overlapping the upright post (12) such that the backboard (16) adjustably slides along the upright post (12) during installation of the mounting pedestal. A single installer can accurately determine the center height of a coin slot (19) of the telephone (18) before mounting the telephone within the backboard mounting enclosure (16) by use of a coin slot center height indicator (141). The upright post (12) allows mounting of a backboard (16) and telephone at a selectively variable height, and also allows the mounting of a second backboard (16') and telephone at the selected height.

18 Claims, 7 Drawing Sheets

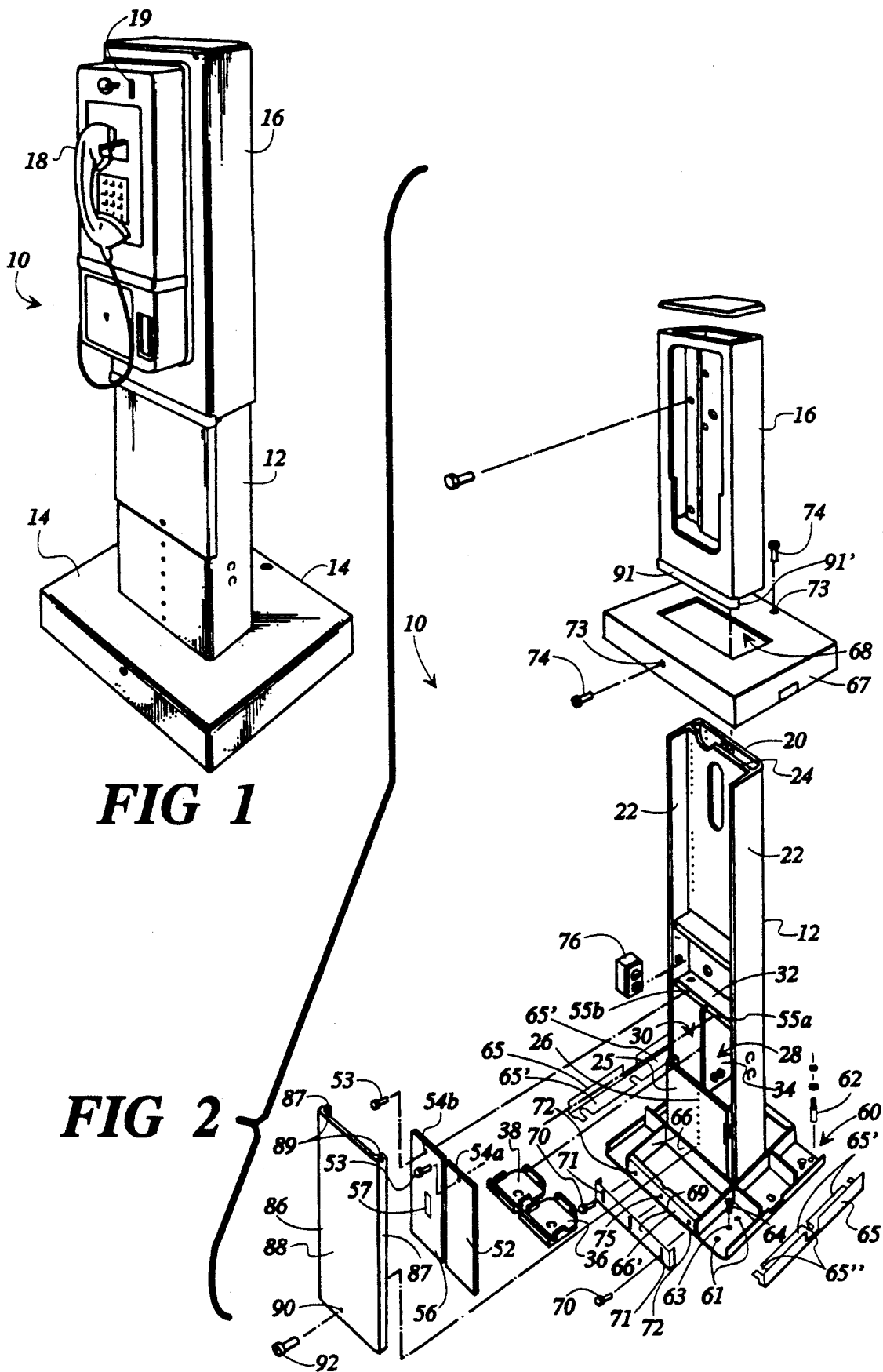

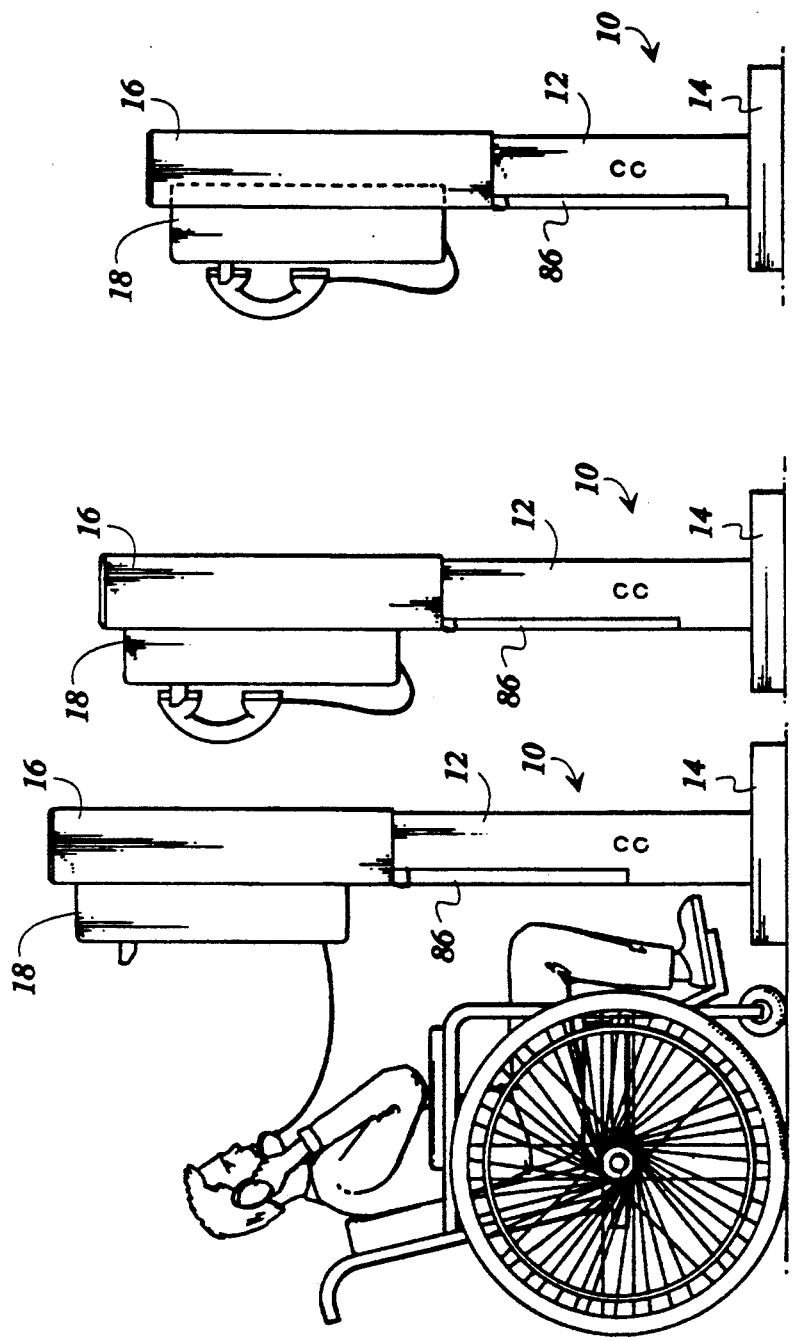

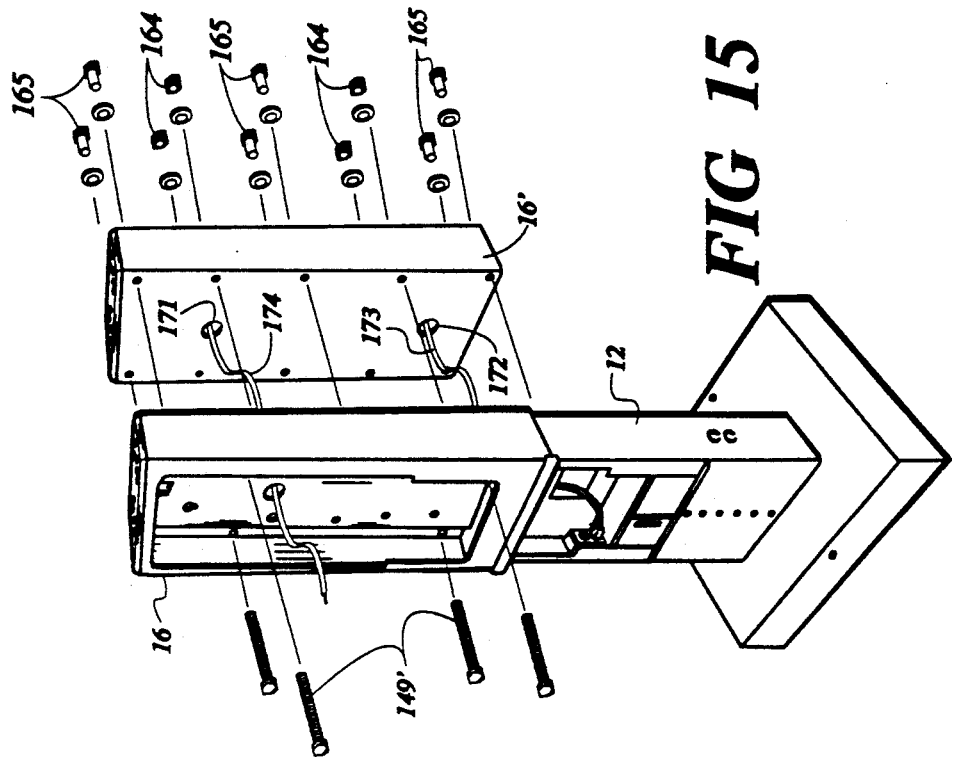
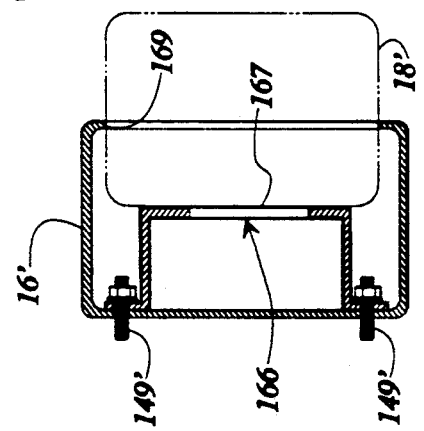
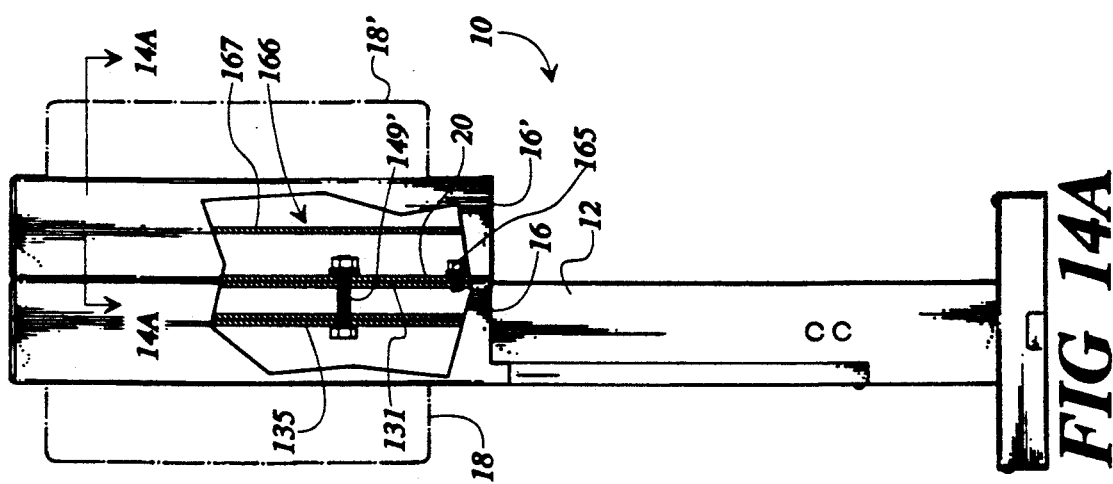

ADJUSTABLE HEIGHT PEDESTAL FOR PUBLIC AND COIN TELEPHONES

TECHNICAL FIELD

The present invention relates generally to public or coin operated telephone mounting arrangements, and relates more particularly to an adjustable variable height mounting pedestal suitable for use in walk-up, drive-up, and handicap access public telephone applications.

BACKGROUND OF THE INVENTION

Many public telephone booth and pedestal mounting arrangements are purchased and installed by building contractors and property owners rather than by telephone companies, and the proceeds from operation of such telephones are retained by the property owners. As a result, contractors and property owners purchase public or coin telephone mounting arrangements from manufacturers thereof and have an installation mechanic install the telephone mounting arrangement at a desired location. Afterwards, a telephone company mechanic installs the telephone to the mounting arrangement.

Because there is a variety of different applications for public or coin telephones, each requiring a separate type of mounting arrangement to accommodate varying telephone height requirements, adjustable telephone height mounting pedestals have been developed. For example, there are telephone applications for conventional pedestrian use, for drive-up use, either in a curbside mounting or directly installed on the pavement of a parking lot, and for handicap access use. Adjustable telephone pedestals allow for the manufacture of a single telephone arrangement adaptable for installation in all of these applications with the telephone mounted to the pedestal at a selected height above the ground. However, these adjustable telephone pedestals have been designed in a manner that makes installation of the telephone at an accurate height often difficult and time consuming.

Typical of such an adjustable height mounting pedestal for public and coin telephones is U.S. Pat. No. 5,020,103 to Holland. This adjustable height mounting pedestal employs a backboard mounting enclosure mounted at a selected height along a vertical wall of an upright pedestal to secure the telephone to the upright pedestal. A pair of adjustable height U-shaped channels, each containing threaded studs welded onto the channel, are utilized by a single installer to attach the backboard mounting enclosure to the pedestal. The installation of the Holland pedestal can be accomplished be a single installer.

Another type of adjustable telephone pedestal, known in the telephone mounting industry as a "Universal Adjustable Pedestal," manufactured by Nix & Miller Co., Buford, Ga., U.S.A. and by Acoustics Development Corporation, St. Joseph's, Mo., U.S.A., includes an elongate upper pedestal assembly, which supports and encloses a public or coin telephone and which is telescopically mounted to a relatively short bottom pedestal assembly. The upper pedestal assembly can be adjustably affixed at different heights along the bottom pedestal assembly, allowing for installation of the telephone at a selected height, by use of mounting bolts located along the exterior side walls of the pedestal. Because the upper pedestal assembly is much greater in length than the bottom pedestal assembly, and because the mounting bolts are exposed, this type of telephone mounting arrangement can be vandalized easily. The longer length of the upper pedestal assembly, as compared to the length of the bottom pedestal assembly, in combination with the weight of the telephone mounted to the upper pedestal, limits the strength of the attachment of the upper pedestal assembly to the lower pedestal assembly by subjecting the exposed mounting bolts to stress and shear forces. In addition, the exposure of the mounting bolts to the public subjects the bolts to potential tampering and possible removal. Thus, a vandal can loosen or eventually separate the upper pedestal assembly from the bottom pedestal assembly by loosening the mounting bolts and applying sufficient lateral force to the upper pedestal assembly so as to move the upper pedestal back and forth in a rocking fashion. This movement of the upper pedestal places extreme stress and shear forces on the loosened mounting bolts and can eventually loosen or break the mounting bolts.

During installation of the prior art universal adjustable pedestal, a single installer must support the upper pedestal assembly with one hand while stretching toward the bottom of the pedestal to insert simultaneously the mounting bolts into the aligned openings on the upper pedestal assembly and the bottom pedestal assembly. This can be an awkward, and sometimes difficult task. Thus, installation of these prior art adjustable height pedestals can be time consuming.

Additionally, it is known that certain state regulatory agencies require a specified mounting height or mounting height range for a public or coin telephone that does not exceed 54 inches for a standard handicap access height. Specifically, such governmental regulations typically specify that the center height for the coin slot of the telephone, the highest user interactive part of the telephone, cannot exceed this 54 inch limit, to provide for access to the telephone by the general public as well as by individuals in wheelchairs. The height for the coin slot in normal drive up applications is approximately 48 inches, and curbside drive up height is approximately 46 inches. Furthermore, many state regulations require that these coin slot heights be measured at a point thirty six inches in front of the coin slot.

However, prior art adjustable height pedestals have not provided an installer with an easy to use and accurate built-in mechanism for the determination of the center height of the coin slot at a point thirty six inches in front of the coin slot prior to the mounting of the telephone to the pedestal. Thus, it is difficult for an installer to determine accurately the center height of the coin slot during installation of prior art adjustable height pedestals because the telephone is typically mounted to the pedestal by the telephone company installer on a later date after the installation of the pedestal.

In particular, the installation of prior art adjustable height pedestals requires the installer to install the pedestal at the required coin slot center height without a reference point for the position of the coin slot by either visually gauging the approximate center height of the coin slot during the installation of the pedestal or by utilizing an independent measuring device to measure the approximate center height for the coin slot during the pedestal installation. In either case, the installer might be required to return to the pedestal installation site, after the telephone has been mounted to the installed pedestal, and adjust the pedestal height to satisfy the state regulatory requirement of a specific coin slot center height for standard handicap access of the mounted telephone.

Furthermore, prior art adjustable height pedestals, when installed on an inclined surface, create a gap between the mounting base of the telephone pedestal and the inclined surface upon which the pedestal is mounted. A user of the telephone can get his foot caught within this gap and damage his shoe or possibly injure his foot. Also, many telephone pedestals are leveled on a mounting surface by use of leveling bolts that bear down against a leveling plate to prevent the bolts from digging into the mounting surface. However, the leveling plates provided in prior art pedestals typically have to be installed at the same time the base of the pedestal is secured to the mounting surface. This requires alignment of the mounting bolts and the mounting holes in both the leveling plates and the base of the pedestal, for insertion of the mounting bolts through the pedestal base and into the mounting surface, a task that can be tedious and sometimes difficult.

Accordingly, there is a need for an improved adjustable height mounting system for public or coin telephones that is easily installed at a mounting site by a single installer. In addition, there is a need for an improved adjustable height pedestal that provides an accurate height determination mechanism for allowing the installer to determine accurately the center height of the coin slot of the telephone before the mounting of the telephone to the adjustable height pedestal. Furthermore, there is a need for an adjustable height pedestal that is more secure from vandalism and theft than prior art telephone mounting arrangements, yet which is flexible and versatile to accommodate a variety of mounting arrangements. Also, there is a need for such an adjustable height pedestal that securely attaches an upper pedestal telephone mounting portion to a lower, base pedestal wherein the mounting bolts are protected and not subject to excess stress and shear forces. Furthermore, there is a need for an improved adjustable height pedestal that protects the feet of a user of a telephone mounted to the pedestal from becoming caught between the pedestal base and the mounting surface, and that allows for easy installation of leveling plates during the leveling process of the pedestal base.

SUMMARY OF INVENTION

Briefly described, the present invention comprises an elongate upright tubular mounting pedestal or post and a backboard mounting enclosure telescopically mounted to the upright post. The upright post includes a plurality of parallel and spaced apart mounting holes for providing a plurality of mounting heights for the telephone backboard mounting enclosure, to which the public or coin telephone is attached. A single installer securely mounts the backboard mounting enclosure to the upright post at a selected height by telescopically adjusting the backboard mounting enclosure to the proper height and inserting each of a plurality of mounting bolts through mounting holes positioned along the backboard mounting enclosure and into a selected set of mounting holes along the upright post. The telephone is then secured within the backboard mounting enclosure with the backboard mounting enclosure enclosing the rear half of a public or coin telephone.

The backboard mounting enclosure, which is provided for securely mounting the telephone to the upright post, is a generally rectangular enclosure and includes an opening within a front wall that conforms to the peripheral configuration of the public or coin telephone for which the mounting is adapted. The telephone is mounted to the backboard mounting enclosure so that the front wall of the backboard mounting enclosure surrounds the periphery of the telephone a distance forward of the rear half of the telephone. The juncture between the front and rear halves of the telephone housing is thereby encased in the backboard mounting enclosure and protected from prying tools. The mounting of the telephone within the backboard mounting enclosure denies the public any access to the mounting bolts utilized to mount the backboard mounting enclosure to the upright post.

The backboard mounting enclosure is much shorter in length than the upright post. Thus, the larger upright post provides a relatively sturdy base upon which to mount the backboard mounting enclosure and the telephone. Even with the backboard mounting enclosure telescopically raised to its maximum height, the upright post still extends over two thirds of the length of the pedestal, and thus eliminates the extreme leverage that could be generated in prior art pedestals by pushing against the top adjustable portion of these pedestals.

A coin slot center height indicator is provided to permit the installer to determine accurately the installed center height of a coin slot on the telephone before attachment of the telephone to the backboard mounting enclosure. The coin slot center height indicator includes a plurality of coin slot center height indications affixed to the interior of the upright post. An indication opening is located on the rear wall of the backboard mounting enclosure and is aligned with the indications to allow a selected indication to be displayed within the indication opening upon the installer adjustably sliding the backboard mounting enclosure upon the upright post. Each of the indications corresponds to a predetermined center height of the telephone coin slot above the base of the upright post.

A coin slot center line opening located along the rear wall of the backboard mounting enclosure provides the installer with an indication of the installation location of the coin slot with respect to the backboard mounting enclosure. The installer can accurately determine the installed center height of the coin slot before the attachment of the telephone to the backboard mounting enclosure by measuring the height of the coin slot center line opening above the ground or mounting surface at a point far enough in front of the pedestal to comply with the state regulations governing such measurements. Thereafter, the installer adjustably slides the backboard mounting enclosure along the upright post to adjust the mounting height of the backboard. By comparing this measurement to the indication displayed within the indication opening in the backboard, the installer can accurately determine any necessary adjustment for the height of the backboard mounting enclosure on the upright post and thereby easily mount the backboard at the height required to satisfy the selected center height for the telephone coin slot.

State regulations governing the installation of public telephones provide for a maximum coin slot height limitation of 54 inches to allow for handicap access. The design of the backboard mounting to the pedestal limits the installed height of the coin slot to 54 inches, and, thus, makes installation of the telephone with the coin slot higher than this height limitation virtually impossible. The backboard can also be mounted to the pedestal with the coin slot height set at a height less than 54 inches to allow for a normal drive-up height of 48 inches, a curbside drive-up height of 46 inches, or any height within a range from 46 to 54 inches in one inch increments.

A front removable cover is removably attached to the upright post by at least one fastening means to enclose a telephone signal wiring junction box and a power wiring junction box within the lower portion of the upright post. The front removable cover is adjustably attached to the upright post in order to mount to the upright post at a position adjacent the backboard mounting enclosure, thereby ensuring that the interior of the upright post is always sealed.

A second telephone can be mounted to the pedestal by means of a modified backboard mounting enclosure adapted to be secured to the back wall of the main backboard mounting enclosure. The design of the modified backboard mounting enclosure is similar to that of the telescoping backboard mounting enclosure in that the front wall of the modified backboard surrounds the periphery of the second telephone. The juncture between the front and rear halves of the second telephone is thereby encased in the modified backboard mounting enclosure and, likewise, protected from potential vandalism.

The base of the pedestal is provided with a front toe guard plate adjustably mounted to the front of the pedestal base. When the pedestal is installed on an inclined surface, the toe guard plate can be adjusted up or down to cover or block the gap created between the bottom of the base and the mounting surface. The toe guard plate prevents the feet of telephone users from becoming caught within this gap and possibly causing damage to a shoe or injury to a foot. The base of the pedestal is further provided with leveling plates that are adapted to mount to the base of the pedestal after the pedestal is anchored to the mounting surface. This eliminates the requirement of aligning the anchor bolt holes in both the leveling plates and the pedestal base, and thus, reduces installation time.

Accordingly, it is an object of the present invention to provide an improved adjustable height mounting pedestal for public or coin telephones.

Another object of the present invention to provide a novel method and mounting structure facilitating the mounting of a public or coin telephone and its associated enclosure at variable heights, in a manner such that only one person is necessary to mount the telephone and its enclosure in a secure manner.

It is another object of the invention to provide an adjustable height telephone mounting pedestal that allows mounting of the telephone at heights ranging from a standard maximum handicap access height, to a normal driveup height, for use in a parking lot when the pedestal is located on the flat pavement, to a curb-side mounting height for a drive-up type installation where the pedestal is mounted on a curb.

It is another object of the present invention to provide a standardized mounting pedestal and backboard that provides mounting arrangements for different telephone height applications, thus allowing for the manufacture of a single telephone pedestal adaptable for installation in many applications.

It is another object of the present invention to provide an improved adjustable height mounting pedestal for public or coin telephones that allows back-to-back mounting of two telephones at the same height.

It is another object of the present invention to provide a novel method and height indication mechanism facilitating the determination of a center height for a coin slot of a public or coin telephone mounted on and enclosed within an adjustable height pedestal.

It is another object of the present invention to provide an improved adjustable height mounting pedestal for public or coin telephones that prevents the public from gaining any access to installation screws, bolts, or nuts that are utilized to install the adjustable height pedestal at a selected height.

It is another object of the present invention to prevent injury or damage to the feet or shoes of a user of the telephone mounted to a telephone pedestal when the pedestal is installed on an inclined surface.

It is another object of the present invention to make the task of leveling an adjustable height mounting pedestal simpler and quicker than it is with prior art pedestals.

These and other objects, features, and advantages of the present invention may be more clearly understood and appreciated from a review of the following detailed description of the disclosed embodiment and by reference to the appended drawings and claims.

BRIEF DESCRIPTION OF THE DRAWINGS

FIG. 1 is a front perspective view of an improved adjustable height telephone mounting pedestal constructed in accordance with the preferred embodiment of the present invention, with a public telephone mounted thereto;

FIG. 2 is an exploded front perspective view of the preferred improved adjustable height mounting pedestal of FIG. 1, with the various panels and elements removed from the pedestal;

FIG. 3, consisting of FIGS. 3A-3C, are side elevational views of the preferred adjustable height mounting pedestal shown in FIG. 1, illustrating various mounting configurations of a single telephone mounting at different heights;

FIG. 14A is a side plan view of the preferred adjustable height mounting pedestal shown in FIG. 1, but illustrating a second backboard mounting enclosure mounted in back-to-back relationship with the original backboard mounting enclosure, with a portion of the backboard enclosures cut away illustrating the mounting bolts for the backboard enclosures;

FIG. 14B is a detailed sectional view taken along the line 14—14 of FIG. 14A showing the mounting plate of the modified backboard mounting enclosure; and FIG. 15 is a front perspective view of the pedestal of FIG. 14A with the telephones removed showing the mounting bolts for mounting the second backboard mounting enclosure to the upright post.

DETAILED DESCRIPTION

Figure 6:
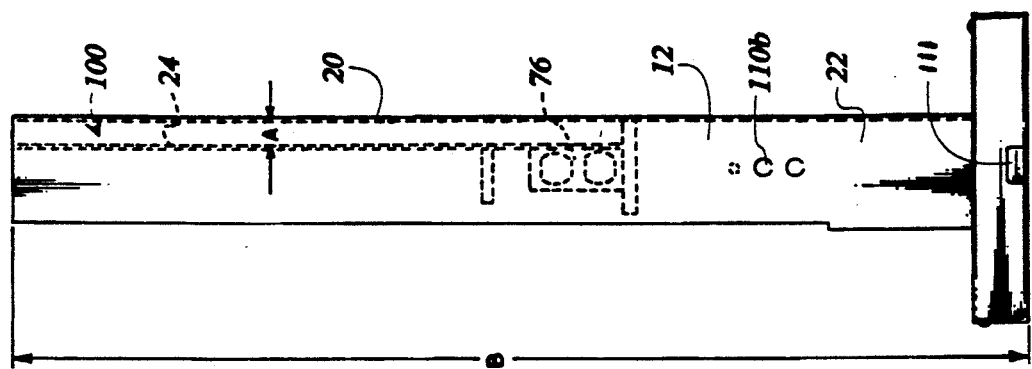
FIG. 6 is a side plan view of the upright post of FIG. 4.

Referring now to the drawings, in which like numerals illustrate like elements throughout the several drawing figures, FIG. 1 illustrates the preferred embodiment of an adjustable height mounting pedestal 10 constructed in accordance with the present invention. The mounting pedestal 10 comprises a generally rectangular tubular upright post 12 that is mounted firmly to a base 14 to support a mounting enclosure 16 referred to as the "backboard" for mounting of a public or coin telephone 18. The backboard 16 is longitudinally aligned with and overlapping the upright post 12 such that the backboard 16 telescopes vertically along the upright post 12.

The backboard 16, and accordingly a coin slot 19 of the telephone 18, may be adjusted for a specific height upon the upright post 12 to provide a standard height for a variety of applications. The backboard 16 preferably is mountable on the post 12 at a selectively variable height wherein the height of the coin slot 19 of the telephone 18 above the ground adjacent the base 14 is within a range from 46 inches for curbside drive-up use to 54 inches for walk-up use or handicap access, in increments of one inch intervals. The post 12 will accommodate mounting of a single backboard 16 at various mounting heights, shown in FIG. 1 and FIGS. 3A-3C, but will also accommodate mounting of a second backboard 16' and a second telephone 18' at the same height as the first telephone 16 on the back side of the post 12 and the back side of the backboard 16 as shown in FIG. 14A.

Referring next to FIG. 2, the upright post 12 is a generally rectangular upright post having a back wall or wall 20, which connects a pair of side walls 22, a channel wall 24, a front wall 25, a telephone signal wiring junction box 28, and a power wiring junction box 30. The channel wall 24 also connects the pair of side walls 22 within the interior of the post 12 and is spaced apart from and parallel to the back wall 20. The front wall 25 connects the side walls 22 along the front of the upright post 12 and extends from the bottom of the post 12 toward the mid-portion of the post 12. The front wall 25 further includes a set of centrally aligned front wall openings 26.

Figure 5:
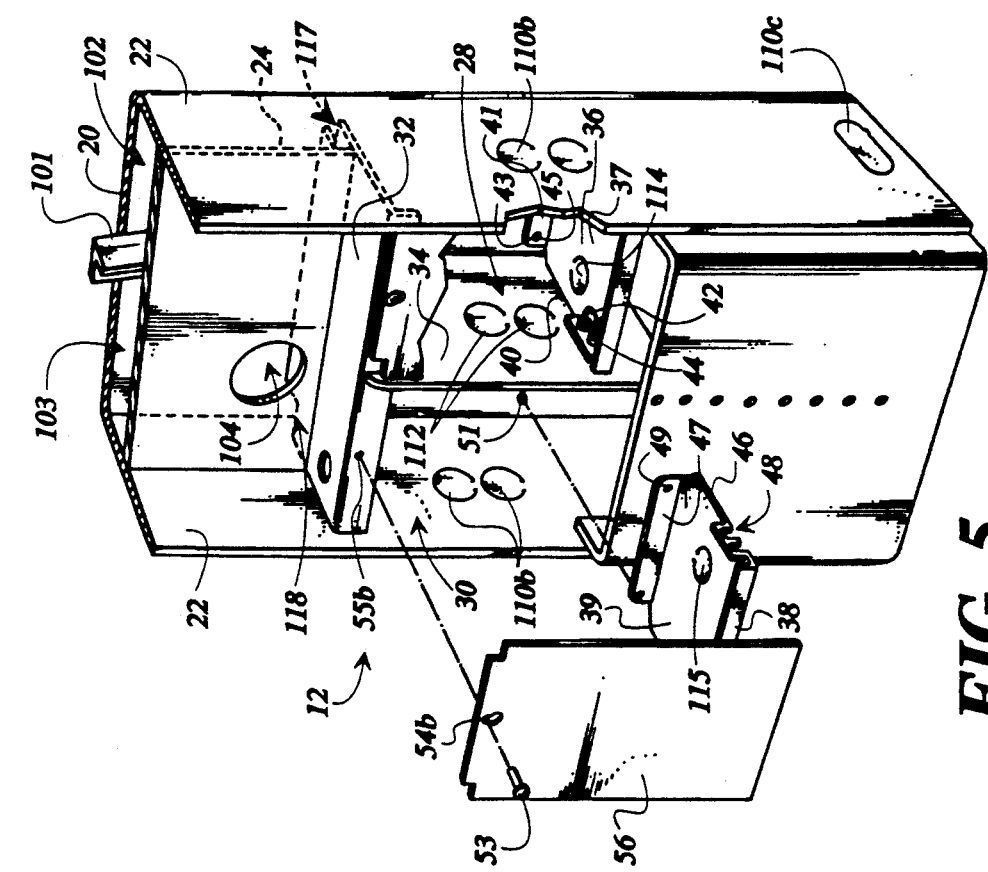
FIG. 5 is a front perspective view of a portion of the upright post employed in the preferred embodiment of FIG. 1.

Telephone signal wiring and power wiring connections or terminations within the interior of the upright post 12 are respectively housed within either the telephone signal wiring junction box 28 or the power junction box 30. As best shown in FIG. 5, the telephone signal wiring junction box 28 defines the space formed by the back wall 20, one of the side walls 22, a fixed shelf 32, a dividing wall 34, and a first removable shelf 36. The fixed shelf 32 spans the space between the side walls 22 and is positioned adjacent to the back wall 20 and generally located at the bottom of the channel wall 24. The dividing wall 34 is generally located between the side walls 22 and extends from the bottom of the fixed shelf 32 to the top of the front wall 25. The first removable shelf 36 is positioned between one of the side walls 22 and one side of the dividing wall 34 and located below the fixed shelf 32 to separate the interior of the telephone signal wiring junction box 28 from the bottom of the post 12. The power wiring junction box 30 is defined by the space formed by the intersection of the fixed shelf 32, the dividing wall 34, the other one of the side walls 22, and a second removable shelf 38. The second removable shelf 38 is positioned between the other one of the side walls 22 and the other side of the dividing wall 34. The second removable shelf 38 is further located below the fixed shelf 32 and separates the interior of the power wiring junction box 30 from the bottom of the upright post 12. The dividing wall 34 effectively separates the interior of the telephone signal wiring junction box 28 from the interior of the power wiring junction box 30.

The first removable shelf 36 includes a pair of first shelf sides 40 connecting a first shelf floor 37 and at least one first shelf flange 41 positioned along the back portion of the first shelf floor 37. At least one of the shelf sides 40 preferably includes at least one first shelf notch 42 and each of the first shelf flange 41 preferably includes at least one first shelf mounting hole 43. The first removable shelf 36 is removably attached to the upright post 12 by mating a selected one of the first shelf notch 42 with a selected one of a first shelf support tab 44 positioned along the dividing wall 34. The support tab 44 is preferably provided by the head of a screw threaded at least partially into the side of the dividing wall 34. Further support for the removable attachment of the first shelf 36 to the upright post 12 is provided by engaging a selected one of the first shelf mounting hole 43 with a selected one of a first shelf support post 45 positioned along the back wall 20.

The second removable shelf 38 includes a pair of second shelf sides 46 connected by a second shelf floor 39 and at least one second shelf flange 47 positioned along the back portion of the second shelf floor 39. At least one of the second shelf sides 46 preferably includes at least one second shelf notch 48 and each of the second shelf flange 47 preferably includes at least one second shelf mounting hole 49. The second removable shelf 38 is removably attached to the upright post 12 by mating a selected one of the second shelf notch 48 with a selected second shelf support tab (not shown) located along the dividing wall 34. The support tab is preferably provided by the head of a screw threaded at least partially into the side of the dividing wall 34. Additional support for the removable attachment of the second removable shelf 38 to the upright post 12 is provided by engaging a selected one of the second shelf mounting hole 49 with a selected one of a second shelf support post 51 positioned along the back wall 20.

Returning now to FIG. 2, the interior of the telephone signal wiring junction box 28 is preferably enclosed by a telephone signal wiring junction box cover 52 upon the completion of the service wiring for the pedestal. The telephone signal wiring junction cover 52 is removably attached to the upright post 12 by preferably inserting a single threaded screw 53 through a slotted opening 54a located along the telephone signal wiring junction box cover 52 and into a post opening 55a on the upright post 12. In similar fashion, the interior of the power wiring junction box 30 is preferably enclosed by removably attaching a power wiring junction box cover 56 to the upright post 12 upon the completion of the service wiring for the pedestal. The power wiring junction box cover 56 is removably attached to the post 12 by inserting a threaded screw 53 through a slotted opening 54b on the power wiring junction box cover 56 and into a post opening 55b positioned on the upright post 12. Each of the preferred slotted openings provided by the openings 54a and 54b permit an installer to loosen the threaded screw to remove the front cover from the post. The threaded screw 53 is preferably provided by a single #8-32×⅜ inch slotted screw.

The junction box cover 56 includes a slotted cover knock-out 57 to provide limited access to the interior of the junction box 30 without removing the cover 56 from the post 12 upon removal of the knock-out 57 to form a knocked-out opening. Each of the telephone signal wiring junction box cover 52 and the power wiring junction box cover 56 protects the interior of the respective junction boxes 28 and 30, and in particular the wiring terminations within the junction boxes, from exposure to the installation environment of the upright post 12. Moreover, the power wiring junction box cover 56 protects an installer from any accidental contact with an exposed power wiring termination within the interior of the junction box 30.

The telephone signal wiring junction box 28 also provides an isolated area for the installation of an optional telephone protection device (not shown), such as a Western Electric #123 or #128 surge protector, or a TII #325 surge protector, for the protection of the telephone 18 from voltage or current surge. Similarly, the power wiring junction box 30 provides an isolated area for the installation of an optional circuit breaker and installation of an optional photo control (not shown) for connection to the 110 volt power wiring within the pedestal 10.

The post 12 is mounted to a mounting surface via a generally square base pan 60. The base pan 60 includes structural reinforcing vertical ribs 66 for securely supporting upright post 12. Base pan 60 also includes a plurality of mounting holes 61. During assembly, the base pan is used as a template to locate the post 12, with the holes 61 being used to mark the mounting surface for drilling to provide for the attachment of fasteners such as concrete anchor bolts 62 or the like. Holes are drilled in the mounting surface and appropriate half-inch fasteners are employed for in-ground mounting of the post 12. Preferably, four anchor bolts 62 are utilized to mount the pedestal 10 to the mounting surface, one generally at each corner of the base pan 60. After the anchor bolt holes are drilled, the anchor bolts 62 are driven into the holes and minimally tightened to secured the base pan 60 to the mounting surface.

The base pan 60 includes leveling bolt holes 63 for receiving leveling bolts 64. A leveling angle plate 65 is provided for each side of base pan 60 and is adapted to slide between the bottom surface of base pan 60 and the mounting surface for providing a rigid surface 65' upon which leveling bolts 64 can bear. Slots 65" are provided in leveling angle plates 65 for receiving the anchor bolts 62 as the leveling angle plates 65 are inserted underneath the base pan 60. These slots 65" allow the base pan 60 to be mounted to the mounting surface prior to attaching the leveling angle plates 65, thus making installation of the pedestal much easier. To level the pedestal, the leveling bolts 64 are installed into threaded inserts in the base pan 60. An installer then lifts the pedestal slightly and slides leveling angle plates 65 under the base pan 60. After which, leveling bolts 64 are adjusted until the upright post 12 is plum. Anchor bolts 62 are then securely tightened. It should be noted that leveling bolts 64 are of sufficient length to raise, if necessary, the upright post 12 one inch above the ground. This one inch adjustment, along with the telescopically adjustable backboard mounting enclosure, allows the telephone to be mounted at a maximum height of 54 inches above the ground, as will be discussed hereinafter.

A front toe guard plate 69 is provided for attachment to the front rib 66' of base pan 60 for blocking any gap between the base pan 60 and the mounting surface created by the leveling of the pedestal on an inclined surface. Screws 70 are inserted through slots 71 of toe guard 69 and into threaded openings 72 of front rib 66' for securement of the toe guard plate 69. With toe guard plate 69 adjusted to cover up the gap below the base pan 60, the feet of a user of the telephone 18 are protected from becoming stuck between the base pan 60 and the mounting surface.

Upon mounting of the post 12 to the mounting surface, a generally square base cover 67, including a generally square base cover opening 68, is mounted to the base pan 60 to completely cover the interior of the base. The base cover opening 68 is slightly larger than the perimeter formed by the walls along the bottom of the post 12 to allow an installer to align the opening 68 with the top of the post 12 and thereby slide the base cover 67 along the post 12 until the base cover 67 completely covers the base pan 60. The base cover 67 further includes mounting openings 73 to allow a threaded security screw 74 to extend through each of the openings 73 and into each of threaded openings 75 (only one shown) on the base pan 60. A threaded security screw, such as a #10-32×⅜ P.I.H. security screw, is preferably used to mount the base cover 67 to the base pan 60 to prevent a vandal from removing the base cover to gain access to the anchor bolts 62 and thereby remove the post 12 from the mounting surface. A typical security screw requires a special installation tool for the installation and removal of the fastener.

A duplex electrical receptacle 76 is affixed within the interior of the upright post 12 to provide the installer with a convenient electrical service utility for the electrical connection of options associated with a telephone booth, including illuminated signage. The duplex receptacle 76 is attached to fixed shelf 32 and is preferably located within the upright post at the intersection of a selected one of the side walls 22, the channel wall 24, and the fixed shelf 32.

A front cover 86 covers the interior of the upright post 12 not enclosed by either the backboard 16 or the front wall 25 to prevent access to the interior of the post by the general public and to protect the interior of the post from exposure to the installation environment of the pedestal 10. The front cover 86 includes a pair of flanges 87 connected to a front cover wall 88. The front cover wall 88 connects the flanges 87 such that the flanges 87 are spaced apart by approximately the maximum distance separating the pair of side walls 22 of the upright post 12. The front cover 86 further includes a pair of notches 89 in flanges 87 and a front cover opening 90. The top edge of the front cover 86 slides underneath a securing flange 91 extending from the lower edge of the backboard mounting enclosure 16. The notches 89 in flanges 87 receive the flange ends 91' of flange 91 for securing the top portion of the front cover 86. The front cover opening 90 is located toward the bottom of the front cover wall 88 and is aligned with the front wall openings 26 located on the front wall 25.

The front cover 86 is removably attached to the pedestal 10 by sliding the top edge of the front cover 86 up underneath the securing flange 91 to where the flange ends 91' engage notches 89 and then threading a front cover security screw 92, preferably a #10-32×⅜ inch P.I.H. security screw, through the front cover opening 90 and into a selected one of the front wall openings 26 in accordance with the selected height of the backboard 16. Upon mounting the front cover 86 to the pedestal 10, the flanges 87 overlap the exterior of the side walls 22. In this manner, the front cover 86 adjustably slides along the side walls 22 prior to the installation of the front cover security screw 92 to cover the portion of exposed interior of the pedestal 10, between the backboard 16 mounted on the post 12 and the front wall 25, for the selected height of the backboard 16. As illustrated by FIGS. 3A-C, the position of the front cover 86 along the upright post 12 varies with the mounting height of the backboard 16.

Figure 4:
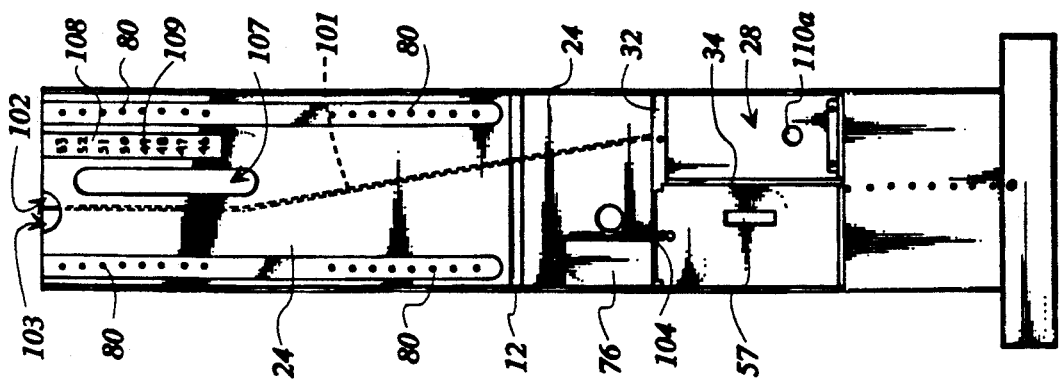
FIG. 4 is a front plan view of the upright post employed in the preferred embodiment of FIG. 1, shown without the cover for the telephone signal wiring junction box.
Figure 7:
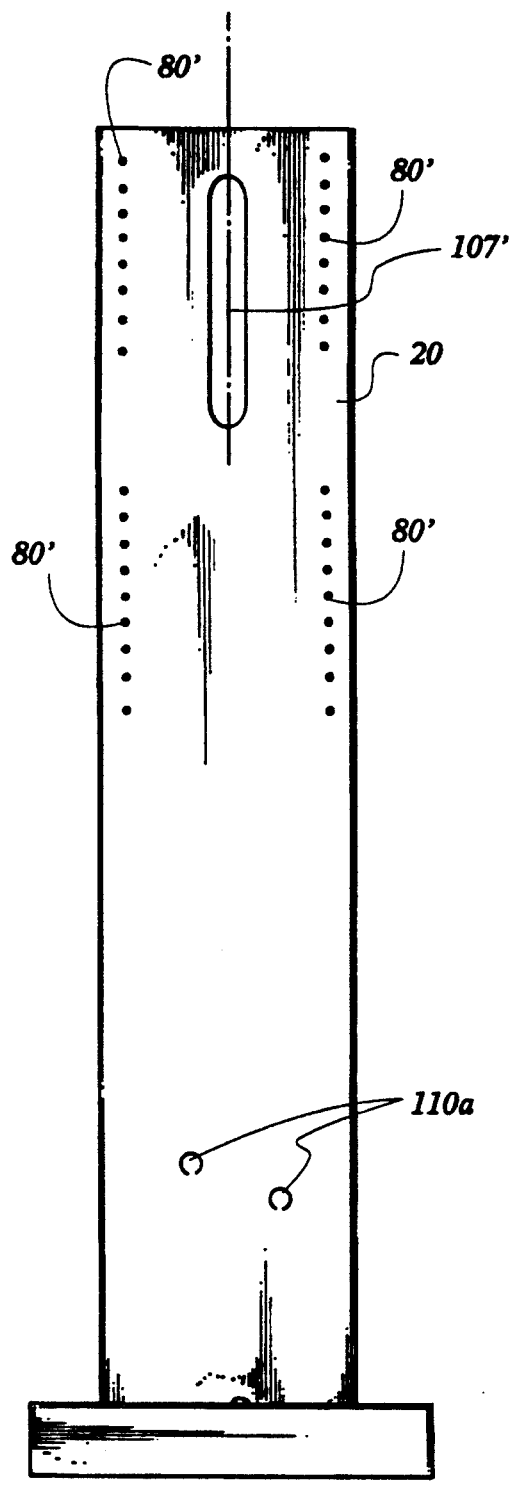
FIG. 7 is a rear plan view of the upright post of FIG. 4.

As shown in FIG. 4, the channel wall 24 includes a plurality of arrangements of parallel and spaced apart mounting holes 80 such that the backboard 16 may be mounted to the upright post 12 at one of a plurality of selected mounting heights. An identical set of mounting holes 80', as shown in FIG. 7, are similarly positioned along the back wall 20 such that selected ones of the mounting holes 80 are aligned with selected ones of the mounting holes 80'. Mounting holes 80' are used for the mounting of a second telephone and associated telephone backboard to the pedestal. In the preferred embodiment, the mounting holes 80 and are provided for mounting the backboard at a range of coin slot center heights between 46 and 53 inches in one inch increments, the coin slot center height being the height of the coin slot 19 above the bottom of base pan 60. The base pan 60, as discussed previously, can be leveled up to one inch above the mounting surface. Thus, the coin slot center height can be adjusted to a maximum height of 54 inches for handicap access, which complies with many state regulations, as discussed hereinafter. The mounting holes 80 are preferably threaded to permit the installer to insert and tighten mounting bolts without the use of retaining nuts for the mounting of the backboard to the post. When considering appropriate mounting heights, it will be understood that normal drive-up height for pavement mounting is 48 inches. Standard walk-up pedestrian height is 54 inches, which corresponds with the maximum standard height for handicap access of the telephone.

10 Referring now to FIGS. 4–6, the space between the back wall 20 and the channel wall 24 defines a wiring channel 100 within the interior of the upright post 12. The wiring channel 100 extends from the top of the upright post 12 to the top of the fixed shelf 32. The wiring channel includes a wiring channel divider 101 that separates the wiring channel into two separate wiring channels, a telephone signal wiring channel 102 and a power wiring channel 103, to provide physical and electrical isolation between the telephone signal and power services. Furthermore, the wiring channel 100 isolates the telephone signal and power services from the remainder of the interior of the upright post 12.

A single electrical receptacle opening 104 is included along the channel wall 24 and adjacent to the power wiring channel 103 for providing a power wiring passageway to the electrical receptacle 76. The opening 104 is preferably positioned near the electrical receptacle 76 to minimize the length of power wiring extending between the opening 104 and the receptacle 76. For example, in the preferred embodiment, the opening 104 is positioned next to the receptacle 76 on the left hand side of the channel wall 24 and above the fixed shelf 32. In this manner, power wiring extending to or from the electrical receptacle 104 passes through the opening 104 and into the power wiring channel 103 without exposing the power wiring to the remainder of the open area of the upright post 12.

The upright post 12 further includes a telephone wiring slot opening 107 located toward the top of the channel wall 24 and a telephone wiring slot opening 107', shown in FIG. 7, positioned toward the top of the back wall 20. Each of the telephone wiring slots 107 and 107' provide a passageway for telephone wiring within the telephone signal wiring channel 102 to pass the mounted backboard for provision to the telephone.

The upright post 12 also includes a coin slot center height indicator 108 located along the top portion of the channel wall 24 and adjacent to a selected arrangement of the mounting holes 80. The coin slot center height indicator 108 contains a plurality of coin slot center height indications to assist the installer's determination of a center height of the coin slot 19 of the telephone 18 during the mounting of the backboard 16 to the upright post 12, as will be described in more detail below.

Referring now to FIGS. 5–7, the upright post further includes a plurality of post knock-outs 110. For the preferred embodiment, a plurality of post knock-outs 110a are located along the back wall 20 (shown in FIG. 7), a plurality of post knock-outs 110b are located along the central portion of each of the side walls 22 (shown in FIGS. 5–6), and a plurality of power knock-outs 110c are located along the bottom portion of each of the side walls 22 (shown in FIG. 5). Either before or after the post 12 is affixed to the ground, selected ones of the post knockouts may be removed by the installer. Each of the post knock-outs 110 provide a passageway for telephone signal wiring or power wiring from the exterior of the pedestal to the interior of the upright post 12. For the preferred embodiment, the post knock-outs 110a are positioned along the back wall 20 such that a passageway is provided for telephone signal wiring and power wiring into, respectively, the telephone signal wiring junction box 28 and the power wiring junction box 30. Similarly, the post knock-outs 110b are positioned along each of the side walls 22 to provide a passageway for telephone signal wiring and power wiring into both the telephone signal wiring junction box 28 and the power wiring junction box 30. Each of the post knock-outs 110c is aligned with a selected one of a base cover knock-out 111 to provide a passageway for telephone signal wiring and power wiring into the base and the bottom portion of the upright post, and thence for provision to either the telephone signal wiring junction box 28 or the power wiring junction box 30.

Those persons skilled in the art will recognize that an installer's wiring of the pedestal requires the removal of only a selected set of the post knock-outs 110. In particular, the removal of a selected set of the post knock-outs 110 is typically dependent upon the installation and service wiring requirements for a specific pedestal site. For example, a selected set of the post knock-outs 110b are generally removed by the installer for the side-by-side installation of two or more of the pedestals. Alternatively, the post knock-outs 110a are generally removed by the installer for a pedestal installation requiring the entrance of service wiring along the back of the pedestal. In similar fashion, the installer generally removes a selected set of the post knock-outs 110c for a pedestal installation requiring the entrance of a service wiring along the bottom of the pedestal.

As best shown in FIG. 5, the first shelf floor 37 of the first removable shelf 36 includes at least one shelf knock-out 114. Upon removal of a selected one of the shelf knock-out 114, the installer can route telephone signal wiring from the bottom of the upright post 12 through the knocked-out opening into the interior of the telephone signal wiring junction box 28. Similarly, the second shelf floor 39 of the second removable shelf 38 also includes at least one shelf knock-out 115. The removal of a selected one of the shelf knock-out 115 provides an opening for extending power wiring from the bottom of the upright post 12 through the opening into the interior of the power wiring junction box 30. In this manner, the installer can direct telephone and power service wiring into the bottom of the upright post 12 through a selected knocked-out one of the post knock-outs 110c and thereby route the appropriate service wiring through the openings provided by the removal of selected shelf knock-outs 114 and 115 into, respectively, the telephone signal wiring junction box 28 and the power wiring junction box 30. As previously described, the installer is provided with convenient access to the bottom of the upright post 12 by removing the first removable shelf 36 and second removable shelf 38.

Side-by-side installation of two or more of the pedestals requires the removal of a set of the post knock-outs 110b along a selected one of the side walls 22 for the provision of telephone and power service wiring from a previously installed pedestal mounted adjacent to the selected side wall 22. Such side-by-side wiring of the pedestal provides both telephone and power service wiring to either the telephone signal wiring junction box 28 or the power wiring junction box 30. Thus, the dividing wall 34 includes a plurality of dividing wall knock-outs 112 to provide a passageway for service wiring between the junction boxes 28 and 30. Isolation between the telephone signal wiring and power wiring is preferably maintained within a junction box during a side-by-side pedestal installation by the use of shielded wiring or conduit wiring. If an additional side-by-side pedestal installation is required, the service wiring is routed through openings created by the removal of set of the post knock-outs 110b along the other one of the side walls 22.

The fixed shelf 32 includes an opening 117 to provide a passageway between the telephone signal wiring junction box 28 and the telephone signal wiring channel 102. In addition, the fixed shelf 32 includes an opening 118 to provide a passageway between the power wiring junction box 30 and the power wiring channel 103. The opening 117 permits the installer to direct telephone signal wiring from the top of the upright post 12 through the opening 117 and into the telephone signal wiring junction box 28 for termination with telephone signal wiring provided to the junction box 28 from the exterior of the pedestal. Alternatively, the opening 117 allows the installer to route telephone signal wiring extending from a wiring termination within the junction box 28 through the opening 117 into the telephone signal wiring channel 102. The opening 118 provides the installer with similar power wiring installation alternatives. Specifically, power wiring from the top of the upright post 12 can be routed within the power wiring channel 103 through the opening 118 into the power wiring junction box 30 or power wiring may be provided from the junction box 30 through the opening 118 into the power wiring channel 103. In this manner, separation of telephone signal wiring from power wiring is maintained through the interior of the upright post 12. For the preferred embodiment, provision for 110 volt AC service is on the left side of the pedestal 10 and provision for DC telephone service is on the right side of the pedestal 10; continuous service wiring separation is maintained throughout the upright post 12 by extending the services wiring through each of the wiring channels 102 and 103.

Figure 8:
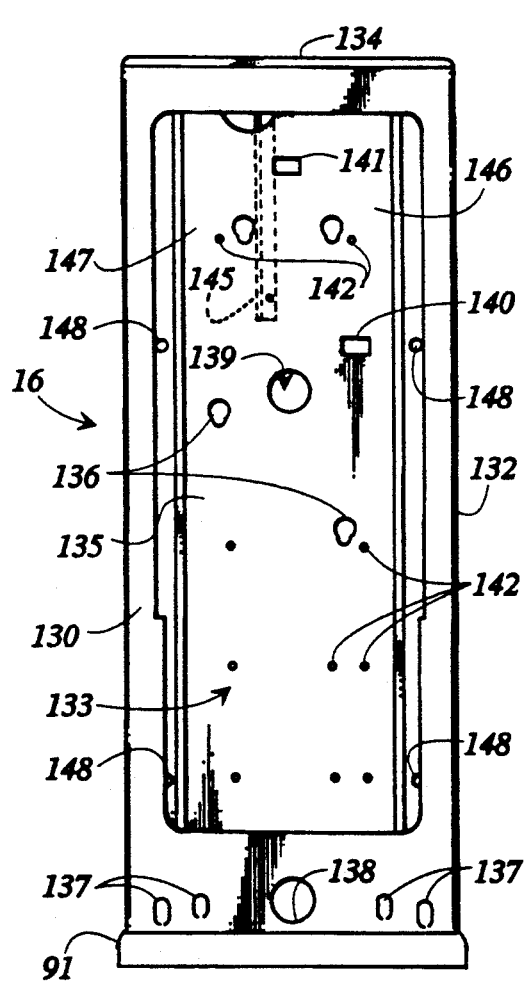
FIG. 8 is a front plan view of the backboard mounting enclosure employed in the preferred embodiment of FIG. 1, without the telephone or any associated parts.
Figure 9:
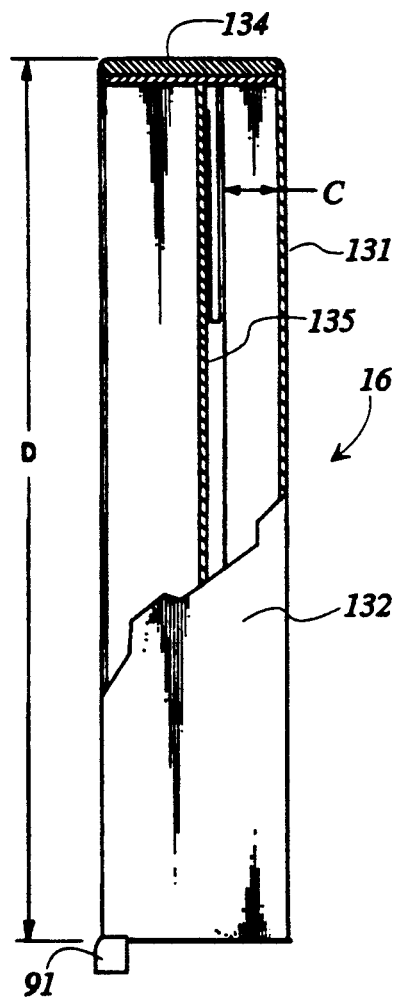
FIG. 9 is a side plan view of the backboard of FIG. 8, partially broken away to show the interior construction of the mounting support plate for the telephone.

Turning next to FIGS. 8 and 9, the backboard mounting enclosure 16 comprises a front wall 130, a back wall 131 spaced apart from and parallel to the front wall 130, a pair of side walls 132 connecting the front wall 130 with the back wall 131, a backboard top plate 134, and a support plate 135 positioned to the rear of the front wall 130 and intermediate to the back wall 131. The front wall 130 includes an opening 133 sized and shaped to conform closely to the outer peripheral configuration of the housing for the public or coin telephone for which the mounting is adapted. The telephone is fastened to the support plate 135 with conventional telephone mounting bolts supplied by a telephone company inserted through telephone mounting holes 142. Slotted key ways 136 are provided along the support plate to support the telephone housing (not shown) until fastened with the telephone mounting bolts.

The backboard 16 further includes mounting holes 137 positioned adjacent the bottom of the front wall 130 of the backboard for mounting a shelf and other accessories associated with the telephone, such as a telephone booth. A power wiring opening 138 is provided in the lower portion of the front wall 130 of the backboard 16. The opening 138 aligns with an opening in a phone booth (not shown) that may be affixed to the backboard and pedestal for insertion therethrough of a power wire for signage lighting.

The support plate 135 is generally U-shaped and is spaced apart from the back wall 131 by a predetermined distance such that when the telephone housing (not shown) is secured to the support plate 135, the walls of the backboard 16 surround the top, bottom, and sides of the telephone but forward of the rear edge of the housing of the telephone. As a result, the juncture between the rear edge of the front housing of a telephone with the front edge of the rear housing is protected inside the backboard and is not accessible for attack by a crow-bar or other prying tool, in the manner as shown and described in U.S. Pat. No. 3,752,927, as shown in phantom in FIG. 3C. A distance C extending across the space between the support plate 135 and the back wall 131 is preferably slightly greater than a distance A spanning the space between the channel wall 24 and the back wall 20 of the upright post 12 (FIG. 6). In this manner, the wiring channel 100 is sandwiched between the support plate 135 and the backboard back wall 131 upon the mounting of the backboard 16 to the upright post 12.

The support plate 135 includes a telephone service opening 139 for provision of telephone signal wiring into the backboard 16 from either the telephone signal wiring slotted opening 107 or 107' of the upright post 12

The support plate 135 further includes a coin slot center height position slot 141 positioned along the support plate such that the position of the slot 141 corresponds to the center height of the coin slot for an installed telephone with the backboard 16. A coin slot center height display opening 140 is also located along the support plate 135 such that the display opening 140 aligns with the coin slot center height indicator 108 on the upright post to display each of the indications 109 as the backboard 16 slides along the post 12. Indications 109, as shown in FIG. 4, indicate the height of the coin slot center height position slot above the bottom of the upright post's base 14.

A portion of the space between the support plate 135 and the back wall 131 is divided into a backboard telephone signal wiring channel 146 and a backboard power wiring channel 147 by a backboard wiring divider 145. The wiring divider 145 extends from the top of the backboard 16 toward the central portion of the backboard 16. The combination of the backboard wiring divider 145 and the wiring channel divider 101 provides a complete vertical separation of telephone signal and power wiring extending from the backboard 16 through the respective wiring channels 146 and 147 into the top of the post 12, and from the top of the post 12 through the respective wiring channels 102 and 103 into the junction boxes 28 and 30, so as to isolate 110 volt power wiring from telephone signal wiring and thereby provide for isolation from electromagnetic interference and also to minimize shock hazards to persons assembling or servicing the assembly. The complete vertical separation of the services wiring is provided for the entire range of predetermined mounting heights for the backboard 16 upon the post 12.

Figure 12:
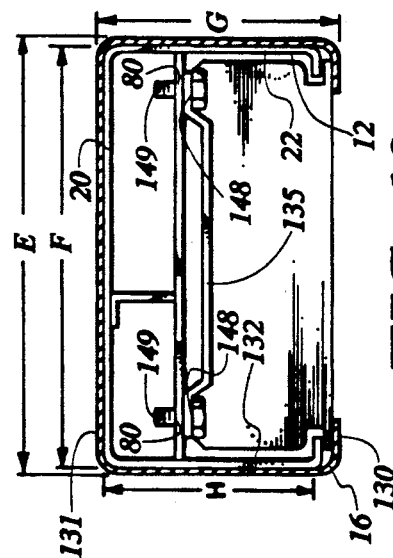
FIG. 12 is a sectional view taken along the line 12—12 of FIG. 11 showing the interior construction of the upper end of the adjustable height mounting pedestal.

The support plate 135 includes a set of backboard mounting holes 148 for the mounting of the backboard 16 to the post 12 by inserting threaded mounting bolts through the backboard mounting holes 148 and into a selected arrangement of the mounting holes 80. For the preferred embodiment, a minimum of four threaded mounting bolts are required to mount the backboard 16 to the upright post 12. As shown in FIG. 12, the threaded bolts 149 are of sufficient length only to pass through the backboard mounting holes 148 and the mounting holes 80. Mounting of the backboard 16 to the upright post 12 does not require the threaded bolts 149 to pass through both sets of the mounting holes 80 and 80'.

As shown in FIGS. 9 and 6, a distance D extending across the space between the top of the backboard 16 and the bottom of the backboard 16 is preferably less than a distance B extending across the space between the top of the post 12 and the bottom of the post 12. In this manner, the post 12 provides a stable foundation for the attachment of the backboard 16 along the post 12 and thereby facilitates a strong attachment of the backboard 16 to the post 12.

Figure 10:
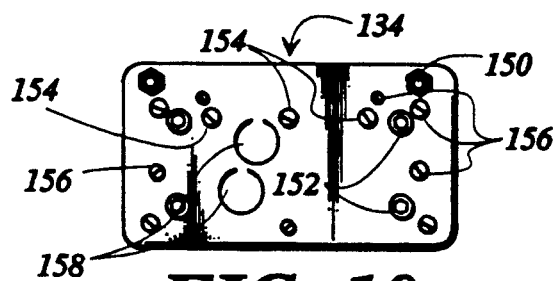
FIG. 10 is a top plan view of the backboard of FIG. 8.

Referring now to FIG. 10, the top plate 134 includes a plurality of top plate service wiring openings 150 for provision of service wiring from the exterior of the pedestal 10 to the interior of the backboard 16. When selected ones of the openings 150 are not utilized for the pedestal installation, each of the selected openings is preferably filled with a ⅛ inch diameter, ⅛ inch NPT pipe plug. The top plate 134 further includes a plurality of top plate threaded openings 152 for the attachment of the top plate 134 to the backboard 16 and a plurality of threaded openings 154 and 156 for the attachment of pedestal options to the top panel 134. Four ⅛×16×1 inch bolts are threaded into each of the openings 152 to attach the top panel 134 to the backboard enclosure 16. A set screw plug, preferably a ⅛-13 set screw plug, is threaded into each of selected ones of the openings 154 to attach either an optional Western Electric list 170 series mast (not shown). Alternatively, a ⅛×16 plug is threaded into each of selected openings 156 to attach an optional Phillips & Brooks/Gladwin R4 antenna mast or Benner Nawman antenna mast (not shown) to the top plate 134. For installation of the optional Phillips & Brooks/Gladwin R4 antenna mast, the installer also removes a selected one of a plurality of wiring knockouts 158 located on the top panel for provision of services wiring from the exterior of the pedestal 10 to the interior of the backboard 16.

Figure 11:
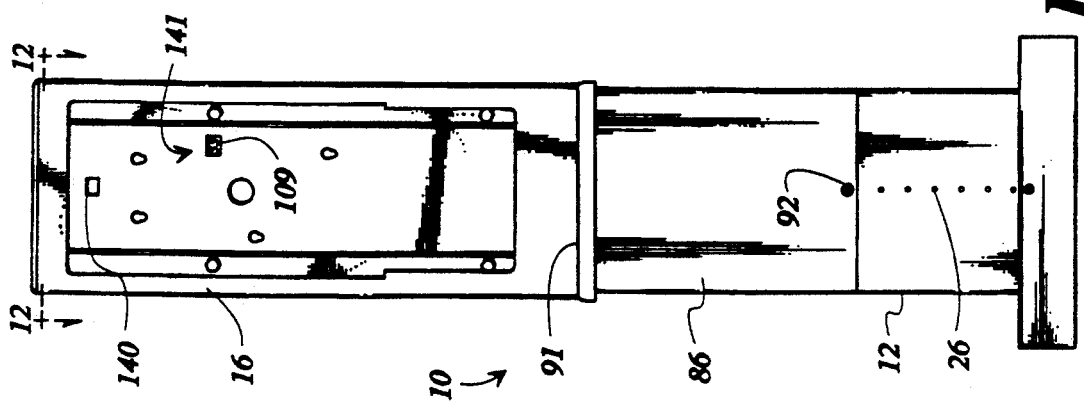
FIG. 11 is a front plan view of the preferred adjustable height mounting pedestal of FIG. 1, without the telephone.

As perhaps best shown in FIG. 11, the backboard 16 is longitudinally aligned with and positioned along the upright post 12 at a predetermined mounting height. The coin slot center height display opening 141 displays a selected one of the center height indications 109 corresponding to the predetermined mounting height for the backboard 16, which for the preferred embodiment, corresponds to the coin slot center height. The front cover 86 adjustably mounts to the pedestal 10 to accommodate the range of predetermined mounting heights for the backboard 16 upon the post 12, as previously described, by the engagement of the top edge of the front cover 86 underneath the securing rib 91 of the backboard mounting enclosure 16 and the threading of the security screw 92 into a selected one of the front wall openings 26.

Referring now to FIG. 12, a distance E spanning the space between the side walls 132 of the backboard 16 is preferably slightly greater than a distance F spanning the space between the side walls 22 of the upright post 12. In addition, a distance G extending across the space between the front wall 130 and the back wall 131 of the backboard 16 is preferably slightly greater than a distance H extending across the space between the back wall 20 and the front of each of the side walls 22 of the upright post 12. In addition, as previously described, the distance C is preferably slightly greater than the distance A. Accordingly, upon aligning backboard 16 with upright post 12, the backboard 16 telescopically slides along the upright post 12 before mounting of the backboard to the post. As illustrated in FIGS. 3A-C, the height of the pedestal 10 can be adjusted to accommodate a range of predetermined coin slot center heights. For the preferred embodiment, the height of the pedestal 10 can be adjusted by the installer to accommodate the range of coin slot center heights of 46 inches to 54 inches in one inch increments.

Figure 13:
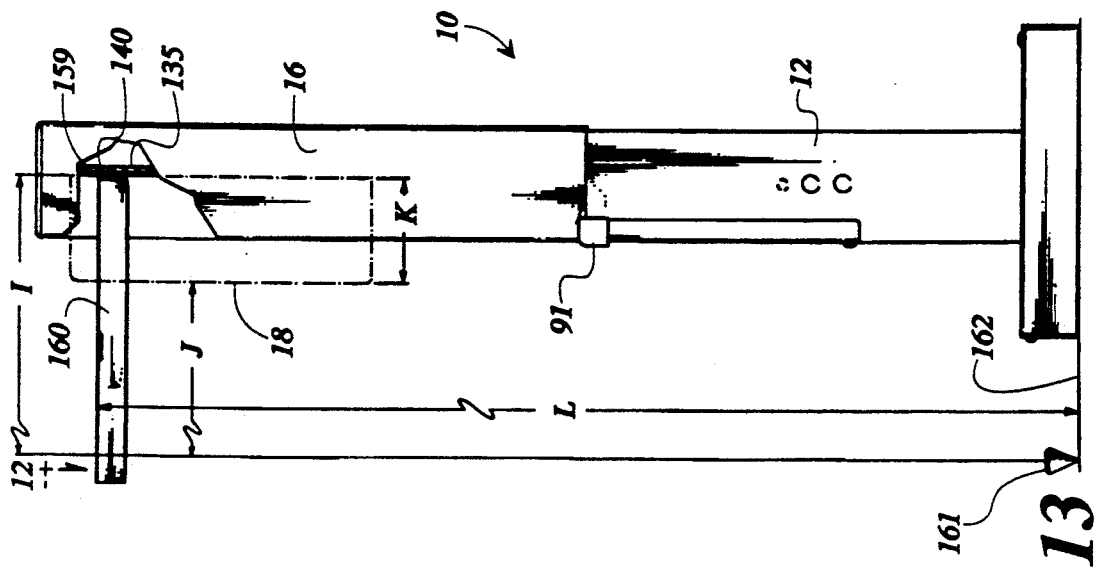
FIG. 13 is a side plan view of the adjustable height mounting pedestal of FIG. 1 and the associated measurements required for the determination of an accurate coin slot center height.

For the preferred embodiment shown in FIG. 13, the installer determines the coin slot center height by first temporarily attaching a post 159, such as a nail or a pencil, approximately one half inch from the end of a 48 inch carpenter's level 160, and then inserting the post 159 into the coin slot center height position slot 140 located along the support plate 135. By pushing the end of the level 160 against the support plate 135 such that the post 159 rests on the bottom of the slot 140, the top of the level 160 corresponds to the center height of the coin slot for an installed telephone. Upon holding the level 160 level, the installer measures a predetermined distance I from the support plate 135 laterally along the level 160, preferably 42 inches, and then drops a straight line plumb 161 from that measured point on the level 160 to the mounting surface 162. The distance I corresponds to the combination of a distance K, the distance across the space between the support plate 135 and the front of the telephone 18, typically six inches, and a distance J, the distance across the space between the front portion of the telephone 18 and the location on the level 160 at which the installer dropped the straight line plumb 161 to the mounting surface 162. State regulatory agencies typically specify the coin slot center height as a height measured the distance J from the front of the installed telephone 18 and specify this distance to be thirty six inches. However, because the telephone 18 is typically not installed before the mounting of the backboard 16 to the upright post 12, the predetermined distance I is measured from the support plate 135 and accordingly includes the known distance K for the typical width of a side wall of the telephone 18.

After dropping the straight line plumb 161 from the level 160, the installer measures a height L extending the space between the mounting surface 162 and the top of the level 160 at the location along the level a distance I from the support plate 135. If the height L is less than or equal to 54 inches, the height of the backboard 16 satisfies the typical state regulatory body's standard handicap access height for a public or coin telephone. However, if the height L is greater than 54 inches, the installer subtracts the selected or desired coin slot center height from the measured height L and rounds the difference to the next highest whole inch. Next, the installer reads the center height indication 109 displayed by the coin slot center height display opening 141 and subtracts the rounded difference from the indication 109 to produce a second difference. Thereafter, the installer adjusts the height of the backboard 16 such that the coin slot center height display opening 141 displays the second difference as the new coin slot center height indication 109. The new coin slot center indication corresponds to the selected coin slot center height for the mounting of the backboard 16 along the post 12. If necessary, the base 14 of the upright post 12 can be adjusted upwards a distance of one inch be the leveling bolts provided for vertically aligning the post.

Upon determining the desired coin slot center height, the installer supports the backboard 16 and, while the coin slot center height display opening 141 displays the new coin slot center height indication 109, the installer preferably threads four installation bolts 149 through selected backboard mounting holes 148 and into aligned post mounting holes 80. The installation bolts are preferably ⅜-16×1 inch threaded bolts.

As shown in FIGS. 14A, 14B and 15, an additional backboard enclosure 16' can be mounted on a single pedestal 10. In this arrangement, a modified backboard mounting enclosure 16' is mounted to the backside of backboard mounting enclosure 16, as shown in FIG. 14A. A mounting enclosure 16' is mounted to the backside of backboard mounting enclosure 16, as shown in FIG. 14A. A mounting bolt 149' replaces each mounting bolt 149 used to secure backboard 16 to the upright post 12, and is much longer than mounting bolt 149 in order to extend through the back walls 20 and 131 of upright post 12 and backboard 16, respectively, to receive nuts 164. Mounting holes 80' are provided for mounting bolts 149' to extend through, and holes may be drilled through the back wall 131 at the appropriate locations for mounting of the modified backboard 16'. Additionally, extra mounting bolts 165, as shown in FIG. 15, secure the modified backboard 16' to the upright post 12 through additional holes drilled at appropriate locations.

As shown in FIG. 14B, modified backboard 16' has a hat channel 166 including a telephone mounting plate 167 for attachment of a telephone 18' thereto in a manner similar to the attachment of telephone 18 to backboard 16. Modified backboard 16' also has a telephone opening 169 in its front side for closely receiving the second phone 18', thereby enclosing the rear half of telephone 18' upon installation into the modified backboard 16', which protects the telephone 18' from vandalism.

As shown in FIG. 15, a power cord hole 172 and a telephone wire hole 171 can be drilled for connection of a power cord 173 and telephone wire 174 to the second phone 18'. In addition, a telephone booth or enclosure can be mounted to the modified backboard in a manner similar to the mounting of a phone booth to backboard 16.

Thus, it can be seen that upon installation of the second telephone 18' within modified backboard 16', the securing bolts that mount the modified backboard 16' are hidden from view and protected from vandalism, just as the installation bolts 149 used to mount the first telephone installation bolts 149 used to mount the first telephone 18.

An adjustable height mounting pedestal for public and coin operated telephones is now provided that is more vandal resistant than known prior art pedestals, can be installed easily and in accordance with state regulations, and that protects the feet of users from becoming stuck between the pedestal base and the ground The preferred embodiment of the present invention have been disclosed by way of an example and it will be understood that other modifications may occur to those skilled in the art without departing from the scope and the spirit of the appended claims.

I claim:

1. An improved adjustable height mounting pedestal for mounting a public or coin telephone, the telephone having a rear portion, said mounting pedestal comprising:
    an elongate upright post having a base for mounting to a mounting surface;
    an elongate backboard mounting enclosure telescopically mounted to said upright post for supporting the telephone and for enclosing the rear portion of the telephone; and
    fastener means located within an interior portion of said backboard mounting enclosure for adjustably mounting said backboard mounting enclosure to said upright post, said fastener means being generally adjacent to the rear portion of the telephone with the telephone mounted to said backboard, wherein said fastener means is concealed by the telephone upon mounting of the telephone to said backboard mounting enclosure.

2. The improved adjustable height mounting pedestal of claim 1 and further comprising a coin slot center height indication means for accurately determining, an installed center height of a coin slot of the telephone before the attachment of the telephone to said backboard mounting enclosure.

3. The improved adjustable height mounting pedestal of claim 2, wherein said coin slot center height indication means comprises:
   a plurality of coin slot center height indications affixed to said upright post;
   an indication opening located on said backboard mounting enclosure and aligned with said indications, such that a selected indication is displayed within said indication opening upon telescopically moving said backboard mounting enclosure along said upright post; and
   a coin slot center line indication located along said backboard mounting enclosure such that the location of said center line indication corresponds to the position of the coin slot upon the attachment of the telephone to said backboard mounting enclosure,
   wherein each of said center height indications corresponds to a predetermined center height of the coin slot.

4. The improved adjustable height mounting pedestal of claim 1, wherein each of said fastener means is inserted into a selected one of a plurality of backboard mounting holes located along said backboard mounting enclosure and through a selected one of a plurality of parallel and spaced apart openings along said upright post to secure said backboard mounting enclosure to said upright post at a selected one of a plurality of predetermined mounting heights for said backboard mounting enclosure, wherein the spacing of said mounting holes provides a plurality of arrangements of mounting holes corresponding to said plurality of predetermined mounting heights for said backboard mounting enclosure.

5. The improved adjustable height mounting pedestal of claim 1 and further comprising an upright post leveling means for affixing said upright post to the mounting surface in a vertical position.

6. The improved adjustable height mounting pedestal of claim 5, wherein said upright post leveling means includes a leveling plate and a plurality of leveling bolts adjustably attached to said upright post, said leveling bolts adapted bear against said leveling plate with said leveling plate positioned between said leveling bolts and the mounting surface, said leveling plate adapted to insert between said upright post and the mounting surface after said upright post has been mounted to the mounting surface.

7. The improved adjustable height mounting pedestal of claim 6, wherein said leveling plate comprises a notch extending from an edge of said leveling plate for receiving a securing bolt as said leveling plate is inserted between the mounting surface and said upright post.

8. The improved adjustable height mounting pedestal of claim 1 and further comprising a front cover adjustably mounted to said pedestal to enclose a portion of the interior of said upright post.

9. The improved adjustable height mounting pedestal of claim 8, wherein said front cover is removably mounted to said upright post by at least one security fastening means.

10. The improved adjustable height mounting pedestal of claim 1, wherein the telephone has a front housing and a rear housing and wherein said backboard mounting enclosure comprises:
    a front wall including an opening for receiving a public or coin telephone, said opening being shaped to closely conform to the outer perimeter of the telephone;
    a support plate to which the rear housing of the telephone is secured, said support plate extending generally parallel to and spaced apart from said front wall,
    the spacing between said support plate and said front wall being greater than the spacing between the rear housing of the telephone and the rear edge of the front housing of the telephone,
    whereby the juncture between the rear housing and the front housing of the telephone is protected inside said backboard mounting enclosure upon mounting of the telephone to said support plate.

11. The improved adjustable height mounting pedestal of claim 1, wherein said backboard mounting enclosure is telescopically adjustable on said upright post to a maximum height corresponding to a telephone coin slot height above said base of said upright post of fifty-three inches and wherein said base is adjustably securable to the mounting surface at a maximum height of one inch above the mounting surface,
    whereby the maximum height for the telephone coin slot above the mounting surface is fifty-four inches.

12. An improved adjustable height mounting pedestal for mounting a public or coin telephone, comprising;
    an elongate upright post for mounting to a mounting surface;
    an elongate backboard mounting enclosure adjustably mounted to said upright post for supporting the telephone;
    coin slot center height indication means on said pedestal for determining the installed center height of a coin slot of the telephone before attachment of the telephone to said backboard mounting enclosure.

13. The improved adjustable height mounting pedestal of claim 12 wherein said coin slot center height indication means comprises;
    a plurality of coil slot center height indications affixed to said upright post;
    an indication opening located on said backboard mounting enclosure and aligned with said indications, such that a selected indication is displayed within said indication opening upon adjustably moving said backboard mounting enclosure along said upright post; and
    a coin slot center line indication located along said backboard mounting enclosure such that the location of said center line indication corresponds to the position of the coin slot upon the attachment of the telephone to said backboard mounting enclosure,
    wherein each of said center height indications corresponds to a predetermined center height of the coin slot.

14. An improved adjustable height mounting pedestal for mounting a public or coin telephone, comprising:
    an elongate upright post for mounting to a mounting surface;
    an elongate backboard mounting enclosure for enclosing the rear portion of the telephone, said backboard mounting enclosure being of a lesser length than the length of said upright post and said backboard mounting enclosure longitudinally aligned with and overlapping said upright post such that said backboard slides along said upright post;

a coin slot center height indication means on said upright post for accurately determining the installed center height of a coin slot for the telephone before the attachment of the telephone to said backboard mounting enclosure; and a plurality of fastener means for mounting said backboard mounting enclosure to said upright post, each of said fastener means located within the interior of said backboard mounting enclosure such that said fastener means are not accessible to the public upon the mounting of said telephone within the backboard mounting enclosure.

15. The improved adjustable height mounting pedestal of claim 14, wherein said coin slot center height indication means comprises:

a plurality of coin slot center height indications affixed to said upright post;

an indication opening located on said backboard mounting enclosure and aligned with said indications, such that a selected indication is displayed within said indication opening upon adjustably sliding said backboard mounting enclosure upon said upright post; and a coin slot center line located along said backboard mounting enclosure such that the location of said center line corresponds to the position of said coin slot upon the attachment of the telephone to said backboard mounting enclosure, wherein each of said indications corresponds to a predetermined center height of said coin slot.

16. The improved adjustable height mounting pedestal of claim 14 comprises a front cover that is adjustably mounted to said pedestal to enclose a portion of the interior of said upright post.

17. The improved adjustable height mounting pedestal of claim 16, wherein said front cover is removably mounted to said upright post by at least one security fastening means.

18. The improved adjustable height mounting pedestal of claim 14 further comprises a leveling base means for securing said upright post to said mounting surface in a vertical position.

* * * * *

UNITED STATES PATENT AND TRADEMARK OFFICE
CERTIFICATE OF CORRECTION

PATENT NO. : 5,301,229
DATED : April 5, 1994
INVENTOR(S) : Raynor, James E.

It is certified that error appears in the above-indentified patent and that said Letters Patent is hereby corrected as shown below:

Column 20, line 42, change "coil" to --coin--.

Signed and Sealed this

Ninth Day of August, 1994

Attest:

BRUCE LEHMAN

Attesting Officer  Commissioner of Patents and Trademarks